Dec. 3, 1935.  C. S. ASHCRAFT  2,022,644
RECTIFIER
Filed July 3, 1934  2 Sheets-Sheet 1

INVENTOR
CLARENCE S. ASHCRAFT
BY
Fad A Lauer
ATTORNEY.

Dec. 3, 1935.  C. S. ASHCRAFT  2,022,644
RECTIFIER
Filed July 3, 1934  2 Sheets-Sheet 2

INVENTOR
CLARENCE S. ASHCRAFT
BY
Fred W Lanier
ATTORNEY.

Patented Dec. 3, 1935

2,022,644

UNITED STATES PATENT OFFICE 2,022,644

RECTIFIER

Clarence S. Ashcraft, Los Angeles, Calif.

Application July 3, 1934, Serial No. 733,583

13 Claims. (Cl. 175—363)

My invention relates to an apparatus for converting alternating current into direct current. Converters or rectifiers of this type are useful in many industries, and one of the most important uses is in the motion-picture industry for converting AC current into DC current for the operation of projection lamps.

It is an object of my invention to provide a rectifier in which all of the parts are enclosed and particularly in which the rectifier tubes are enclosed. As a result of such a construction the parts are protected from breakage by reason of contact with them, and furthermore the apparatus will have a more pleasing appearance, the enclosing construction being designed with attractiveness of appearance in view.

It is a further object of my invention to provide a rectifier which will, notwithstanding the fact that all of the parts are enclosed, have all of the various parts readily accessible. In the preferred form of my invention I provide the enclosing construction in the form of a pair of compartments. I prefer to arrange the compartments so that there is a lower compartment and an upper compartment supported thereabove. In the lower compartment I prefer to place the transformer means, coils, etc. The upper compartment in the preferred form of my invention is supported on a hinged cover of the lower compartment and in this upper compartment I preferably place the rectifier tubes. The upper compartment may also be provided with a hinged lid. When access to the upper compartment is desired, the hinged lid may be swung into an open position. When access to the lower compartment is desired, the hinged cover for the lower compartment, as well as the upper compartment, is swung into a relatively open position.

A still further object of my invention is to provide a rectifier of the class referred to in which there is an efficient air circulation for cooling the various parts. This is highly desirable, particularly with respect to the rectifier tubes. This object of my invention I accomplish by providing a suitable blower which is preferably mounted directly on the upper compartment.

A still further object of my invention is to provide a combination, as pointed out heretofore, in which the upper compartment or rectifier tube compartment is shaped with a side wall which is curved in such a manner as to enhance free and full circulation of the cooling air therethrough.

It is a still further object of my invention to provide a rectifier having a pair of compartments in which the transformer, coils, etc. and rectifier tubes are mounted and in which the cooling air is conducted from the tube compartment to the transformer compartment and circulated therethrough. In the preferred form of my invention this object is accomplished by providing a conduit connected to the two compartments. The parts are arranged in both compartments so that there are air passages around these various parts. The blower is so mounted that it circulates the air through the upper compartment. The air then passes through the conduit to the lower compartment and the air then circulates through the lower compartment around the parts included therein, all being conducive to an efficient cooling of the various parts.

A still further object of my invention is to provide a rectifier including the transformer mechanism and rectifier tubes in which the parts are compactly arranged in order that they will take up but a minimum of space.

In the following detailed description of the preferred form of my invention, various other objects and advantages of the invention will be made evident.

Referring to the drawings which it is understood are for illustrative purposes only:

Figure 1:
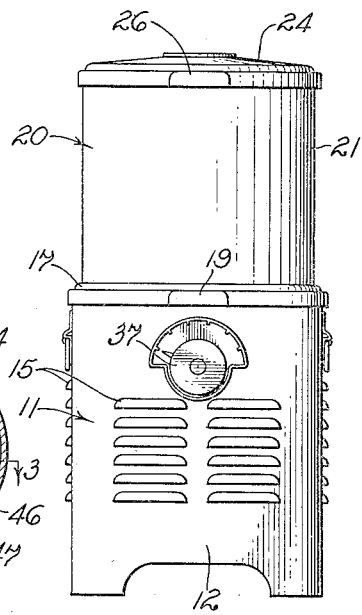
Fig. 1 is an elevational view of a rectifier incorporating the features of my invention.

Referring to the drawings in detail, I will now describe the form of my invention which I have chosen to illustrate the various features thereof.

The numeral 11 represents a lower compartment having a front wall 12, a rear wall 13, and side walls 14. In these walls 12 to 14 inclusive louvers 15 are provided which constitute air outlet means for the lower compartment and enable air to pass outwardly from the interior space or chamber 16 provided in the compartment 11. The lower part or bottom of the compartment 11 is preferably left open to permit a free outward passage of air from the chamber 16, but if desired a bottom wall may be provided and openings formed therein.

For the purpose of closing the top of the compartment 11, there is a hinged cover 17 which is hinged at 18. For the purpose of swinging the cover into a relatively open position, a grip formation 19 is provided. This will enable the cover 17 to be raised upwardly a desired amount so that the chamber 16 may be reached.

Figure 3:
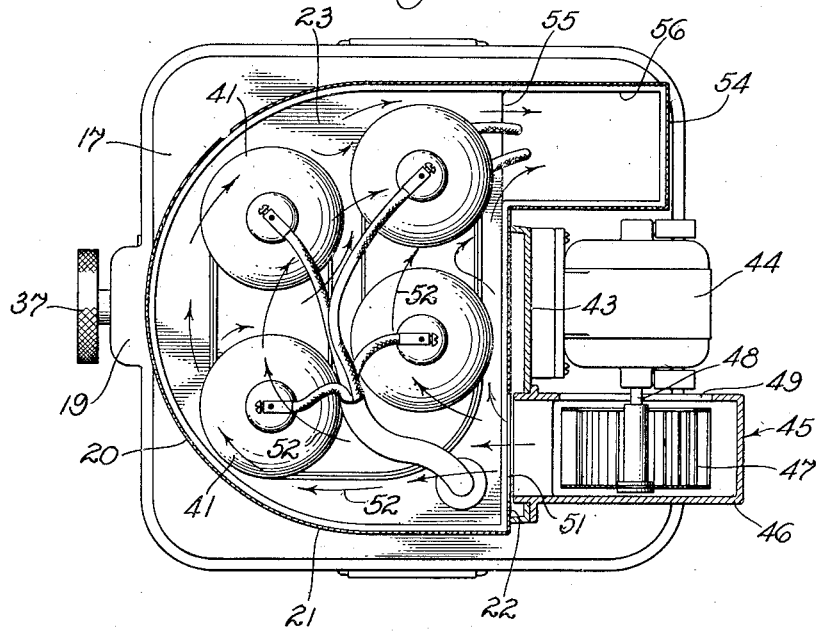
Fig. 3 is a sectional view taken through the upper compartment or rectifier tube compartment, as indicated by the line 3—3 of Fig. 2.
Figure 4:
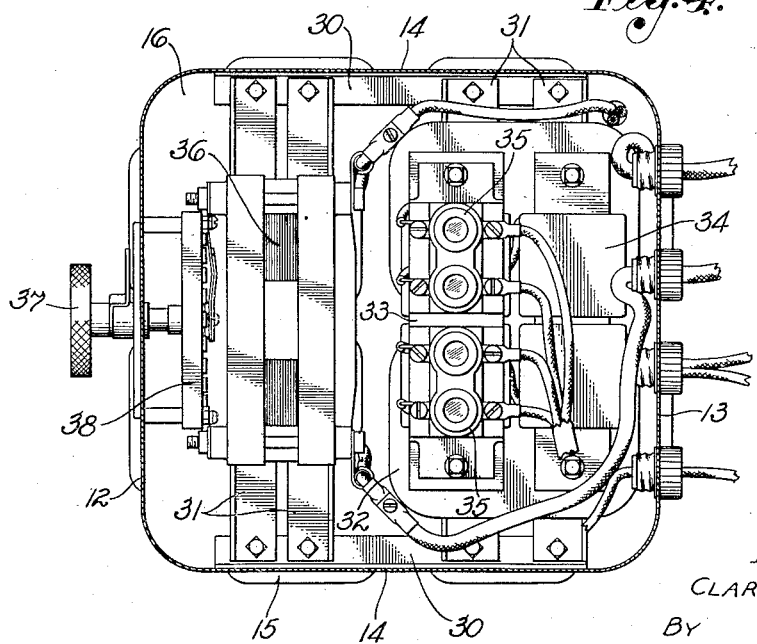
Fig. 4 is a section taken through the lower compartment or transformer compartment, as indicated by the line 4—4 of Fig. 2.

In the form of my invention illustrated herein, the tube compartment is provided in the form of an upper compartment 20 which is mounted directly on the cover 17 so that a portion of the cover 17 constitutes a bottom wall for the compartment 20. The compartment 20, as shown best in Fig. 3, includes a side wall 21 and a rear wall 22. The side and rear walls 21 and 22 are of vertical extension. The side wall 21, however, is curved so that a portion thereof is semi-cylindrical, as shown. The rear wall 22 is preferably flat. The compartment 20 provides a space or chamber 23. To close the upper end of the compartment 20 there is a lid 24 which is hinged at 25 and which is provided with a grip portion 26 to enable the same to be swung into a relatively open position in order to give access to the chamber 23.

In the two compartments 11 and 20, I mount the apparatus whereby the AC current is converted into a DC current.

For the purpose of mounting the parts in the lower compartment 11, the side walls 14 are provided with shelves 30, and mounted on these side walls are supporting angles 31 which extend across the compartment. Carried by these supporting angles are transformers 32, equalizing coils 33 and 34, and fuse blocks 35. Also supported by these angles is a choke coil 36. It will be understood that the parts just referred to are connected together by the various wires shown in accordance with my invention of converter referred to above. It should be understood that other types of apparatus may be included in the chamber. Mounted on the front wall 12 is a control knob 37 which supports a switch 38 for controlling the voltage which passes through the apparatus.

Mounted in the upper compartment 20 and supported by that portion of the cover 17 which constitutes a bottom for the compartment 20 are sockets 40 which carry rectifier tubes 41, there being four in number. These sockets and rectifier tubes are connected to the transformer equalizing coils and choke by the wires shown. However, this hook-up does not constitute a part of the present invention and need not be described herein.

In the preferred form of my invention a blower is mounted on the back wall 22 of the compartment 20. The blower construction includes a mounting casting 43 which is secured to the back wall 22, as shown. The mounting casting carries a motor 44 which is adapted to operate the blower 45. The blower 45 includes a housing 46 in which there is mounted a rotor 47 secured to a shaft 48 which extends to the motor 44. Provided in the housing 46 is an inlet opening 49 through which air is drawn into the housing 46 when the rotor 47 is in operation. Formed in the back wall 22 is an opening 51 through which the blower delivers circulation air to the chamber 23 provided in the compartment 20. It will be noted that the air is introduced substantially tangentially with respect to the side wall 21 and by reason thereof the air will flow through the upper compartment 20 substantially as indicated by the various arrows 52. The air circulates around all of the parts, as illustrated, and effectively cools them.

Figure 2:
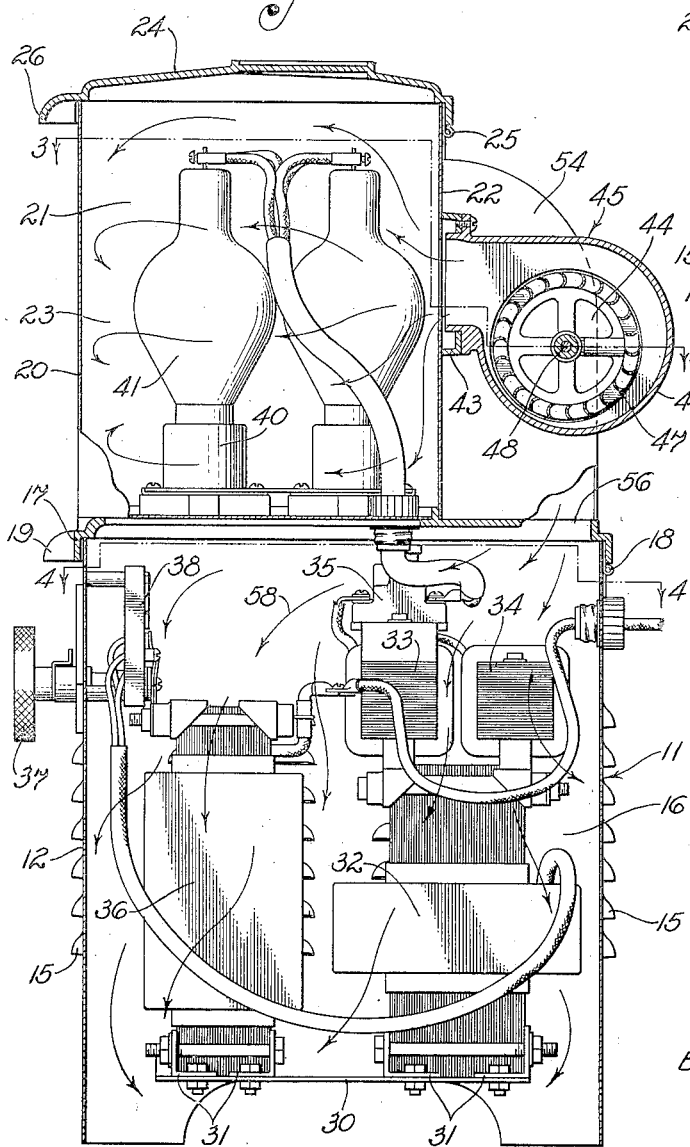
Fig. 2 is a vertical sectional view taken through a rectifier incorporating the features of my invention.

For the purpose of conducting the air from the upper compartment to the lower compartment I provide a conduit 54. This conduit 54 is connected to the rear wall 22 at the side opposite from the place at which the blower is connected thereto and communicates with the interior thereof through an outlet opening 55. This opening 55 is connected tangentially with respect to the side wall 21 and receives the flow of air flowing through the upper compartment 20 at the opposite point from which the air is introduced. This conduit 54 extends downwardly along the rear wall 22 and is connected to the lower compartment 11 through an opening 56 formed in the rearward part of the hinged cover 17. This circulation of air passes downwardly through the conduit 54 and into the lower compartment. The air flows through the lower compartment substantially as indicated by the various arrows 58 of Fig. 2. It will be noted that the parts are arranged so that there are air spaces between them, and it is therefore possible for the air to circulate around the various parts and efficiently keep them cool. The air is induced to flow to all points in the lower compartment due to the provision of the various louvers 15 which produce outlets in the vertical walls and, further, due to leaving the bottom of the lower compartment 11 open which enables a flow of air downwardly from the bottom of the compartment.

As is obvious from the foregoing description and from an inspection of the drawings, the rectifier of my invention is of pleasing appearance, all of the parts being enclosed in an attractive container. It will further be seen that all of the parts are readily accessible. Access to the upper compartment is had by swinging the lid 24 into a relatively open position. Access to the lower compartment 11 is had by swinging the cover 17 into a relatively open position. The blower and motor are mounted on the back of the upper compartment and are therefore readily accessible. It will therefore be seen that the enclosing of the parts does not render them inaccessible or inconvenient to work upon should the same be necessary.

It will furthermore be seen that my invention will adequately cool the various parts notwithstanding the fact that they are enclosed. The novel circulation system which I have worked out has been used in actual practice. It has been found to be highly efficient in cooling the various parts.

I do not wish my invention to be limited to the precise arrangement of parts disclosed herein, since it is obvious to anyone skilled in the art that various modifications may be made without departing from the spirit and scope of the invention. It is not necessary to mount the tube compartment above the transformer compartment and the same may be mounted adacent to each other. However, in actual practice the relative positions of the compartment have been found to be highly satisfactory and well received in the industry.

I claim as my invention:

1. In a converter of the class described, the combination of: a lower compartment; transformer parts mounted therein in relatively spaced relation to provide air circulation spaces around said parts; a hinged cover on said compartment, and being swingable to give access to the interior of said compartment; an upper compartment mounted on said cover; rectifier tubes mounted in said upper compartment; means for delivering a flow of air into said upper compartment; and a conduit connected to the interior of said upper compartment and said lower compartment for conducting the flow of air from said upper compartment to said lower compartment.

2. In a converter of the class described, the combination of: a lower compartment; transformer parts mounted therein in relatively spaced relation to provide air circulation spaces around said parts; a hinged cover on said compartment, and being swingable to give access to the interior of said compartment; an upper compartment mounted on said cover; rectifier tubes mounted in said upper compartment; means for delivering a flow of air into said upper compartment; and a conduit mounted on said upper compartment and connected to the interior of said upper compartment and connected to said cover so as to communicate with the interior of said lower compartment for conducting the flow of air from said upper compartment to said lower compartment.

3. In a converter of the class described, the combination of: a lower compartment; transformer parts mounted therein in relatively spaced relation to provide air circulation spaces around said parts; a hinged cover on said compartment, and being swingable to give access to the interior of said compartment; an upper compartment mounted on said cover; rectifier tubes mounted in said upper compartment; a blower mounted on the side of said upper compartment for delivering a flow of air into said upper compartment; and a conduit connected to the interior of said upper compartment and said lower compartment for conducting the flow of air from said upper compartment to said lower compartment.

4. In a converter of the class described, the combination of: a lower compartment; transformer parts mounted therein in relatively spaced relation to provide air circulation spaces around said parts; a hinged cover on said compartment, and being swingable to give access to the interior of said compartment; an upper compartment mounted on said cover; rectifier tubes mounted in said upper compartment; a blower mounted on the side of said upper compartment for delivering a flow of air into said upper compartment; and a conduit mounted on said upper compartment and connected to the interior of said upper compartment and connected to said cover so as to communicate with the interior of said lower compartment for conducting the flow of air from said upper compartment to said lower compartment.

5. In a converter of the class described, the combination of: a lower compartment; transformer parts mounted therein in relatively spaced relation to provide air circulation spaces around said parts; a hinged cover on said compartment, and being swingable to give access to the interior of said compartment; an upper compartment mounted on said cover, and having a curved side wall; rectifier tubes mounted in said upper compartment; means for delivering a flow of air into said upper compartment in such a direction that said flow of air will circulate in said compartment in a continuous path; and a conduit connected to the interior of said upper compartment and said lower compartment for conducting the flow of air from said upper compartment to said lower compartment.

6. In a converter of the class described, the combination of: a lower compartment; transformer parts mounted therein in relatively spaced relation to provide air circulation spaces around said parts; a hinged cover on said compartment, and being swingable to give access to the interior of said compartment; an upper compartment mounted on said cover, and having a curved side wall and a back wall; rectifier tubes mounted in said upper compartment; means for delivering a flow of air into said upper compartment, said means being connected to said back wall and introducing said flow of air substantially tangentially with respect to said side wall; and a conduit connected to the interior of said upper compartment, through said back wall at a place opposite from which said means is connected, and to said lower compartment for conducting the flow of air from said upper compartment to said lower compartment.

7. In a converter of the class described, the combination of: a lower compartment; transformer parts mounted therein in relatively spaced relation to provide air circulation spaces around said parts a hinged cover on said compartment, and being swingable to give access to the interior of said compartment an upper compartment mounted on said cover, and having a curved side wall and a back wall rectifier tubes mounted in said upper compartment means for delivering a flow of air into said upper compartment, said means being connected to said back wall and introducing said flow of air substantially tangentially with respect to said side wall and a conduit mounted on said upper compartment and connected to the interior of said upper compartment through said back wall at a place opposite from which said means is connected and connected to said cover so as to communicate with the interior of said lower compartment for conducting the flow of air from said upper compartment to said lower compartment.

8. In a converter of the class described, the combination of: a lower compartment; transformer parts mounted therein in relatively spaced relation to provide air circulation spaces around said parts; a hinged cover on said compartment, and being swingable to give access to the interior of said compartment; an upper compartment mounted on said cover, and having a curved side wall and a back wall; rectifier tubes mounted in said upper compartment; means for delivering a flow of air into said upper compartment, said means being connected to said back wall and introducing said flow of air substantially tangentially with respect to said side wall; and an outlet connected to said back wall at a place opposite from which said means is connected thereto, through which said flow of air is taken from said upper compartment.

9. In a converter of the class described, the combination of: a lower compartment; transformer parts mounted in said lower compartment in relatively spaced relation so as to provide air circulation spaces therearound; an upper compartment hinged on said lower compartment so as to be swingable to give access to the interior of said compartment; rectifier tubes mounted in said upper compartment; means for delivering a flow of air into said upper compartment; and a conduit connecting between said compartments for conducting the flow of air from said upper compartment to said lower compartment.

10. In a converter of the class described, the combination of: a lower compartment; transformer parts mounted in said lower compartment; an upper compartment hinged on said lower compartment; rectifier tubes mounted in said upper compartment; means for delivering a flow of air into said upper compartment; and a conduit connecting between said upper compartment and said lower compartment for conducting the flow of air from said upper compartment to said lower compartment.

11. In a converter of the class described, the combination of: a lower compartment; transformer parts mounted in spaced relation in said lower compartment; an upper compartment hingedly connected to said lower compartment; rectifier units mounted in said upper compartment; means on said upper compartment for delivering a flow of air around said rectifier units; and a conduit leading from said upper compartment to said lower compartment for conducting the flow of air around said transformer parts.

12. In a converter of the class described, the combination of: a lower compartment; transformer parts mounted therein in relatively spaced relation; an upper compartment hinged on said lower compartment; rectifier tubes mounted in said upper compartment; blower means adapted to supply cooling air to said rectifier tubes; and means for conducting the cooling air from said upper compartment to said lower compartment for circulation around said transformer parts.

13. In a converter of the class described, the combination of: a lower compartment; transformer parts mounted in said lower compartment; an upper compartment hinged on said lower compartment; rectifier units mounted in said upper compartment; blower means communicating with the interior of said upper compartment for supplying cool air to said rectifier units; and means for causing the cooling air to thereafter flow through said lower compartment around said transformer parts.

CLARENCE S. ASHCRAFT.